United States Patent [19]

Baker et al.

[11] Patent Number: 4,930,364

[45] Date of Patent: Jun. 5, 1990

[54] GLASS CONTAINER INSPECTING MACHINE

[75] Inventors: Russ J. Baker, Horseheads; Robert A. Hansen, Elmira, both of N.Y.

[73] Assignee: Emhart Industries, Inc., Indianapolis, Ind.

[21] Appl. No.: 253,833

[22] Filed: Oct. 5, 1988

[51] Int. Cl.$^5$ ............................................ G01M 19/00
[52] U.S. Cl. .................................... 73/865.8; 324/664
[58] Field of Search .............. 73/865.8, 865.9, 49.2 R, 73/49.3, 52; 250/223 B; 356/428; 209/523, 524, 525, 528; 324/61 R

[56] References Cited

U.S. PATENT DOCUMENTS

| | | | |
|---|---|---|---|
| B 520,227 | 3/1976 | Van Oosterhout | 250/223 B X |
| 3,048,269 | 8/1962 | Murley, Jr. | 209/524 |
| 3,328,593 | 6/1967 | Johnson et al. | 250/223 B |
| 3,356,212 | 12/1967 | Landin | 250/223 B X |
| 3,916,694 | 11/1975 | Loos et al. | 73/865.8 |
| 4,174,633 | 11/1979 | Hoyt et al. | 73/865.9 |
| 4,303,883 | 12/1981 | Mori et al. | 324/208 |
| 4,641,525 | 2/1987 | Merki | 73/865.8 |

*Primary Examiner*—Tom Noland
*Attorney, Agent, or Firm*—Carl A. Forest

[57] ABSTRACT

The thickness of a formed glass container is evaluated around its wall periphery by making a selected sampling of voltage data. An encoder is used which displaces the periphery past a sensor and sampling is synchronized with the pulses of the encoder. When a seam is detected, sampled data is ignored for a chosen number of pulses prior to as well as following and the number of pulses is set by defining the diameter of the container.

3 Claims, 4 Drawing Sheets

GLASS CONTAINER INSPECTING MACHINE

BACKGROUND OF THE INVENTION

1. Field of the Invention.

The present invention relates to apparatus for evaluating the wall thickness of round bottles to make certain that no incorrect thickness is determined due to interference caused by a bottle seam.

2. Description of the Related Art

Round bottles are conventionally rolled along an elongated capacitance sensor which senses the capacitance and hence thickness of the wall of the bottle. An Oscillator is used to determine this capacitance and generate a voltage which can be converted to dimensional data representative of the wall thickness. Whenever the bottle seam rolls past the capacitance sensor, a false "thick spot" will be generated as the seam approaches. A "thin spot" signal will be generated once the seam is at the head and immediately after. This data must be ignored. State of the art systems detect the seam by determining the rate of change or differential of periodic thickness samples. Whenever this differential exceeds a selected threshold, a seam has been detected and a timer which has a fixed period is started. Subsequent samples received during the window of this timer will be ignored.

A problem with the current state-of-the-art is that it is set for the machine to operate at a certain speed. When machine speed is changed, these settings are incorrect. The current state-of-the-art also does not ignore incorrect readings caused by an approaching seam.

It is an object of the present invention to provide an improved apparatus for defining the window during which sampled data will be ignored in the vicinity of this seam. This invention will allow us to ignore incorrectly sampled data before the seam is detected as well as after, regardless of machine speed.

Other objects and advantages of the present invention will become apparent from the following portion of the specification and from the following drawings which illustrate in accordance with the mandate of the patent statues a presently preferred embodiment incorporating the principles of the invention.

BRIEF DESCRIPTION OF THE DRAWING

Referring to the drawings.

DESCRIPTION OF THE PREFERRED EMBODIMENT

Figure 1:
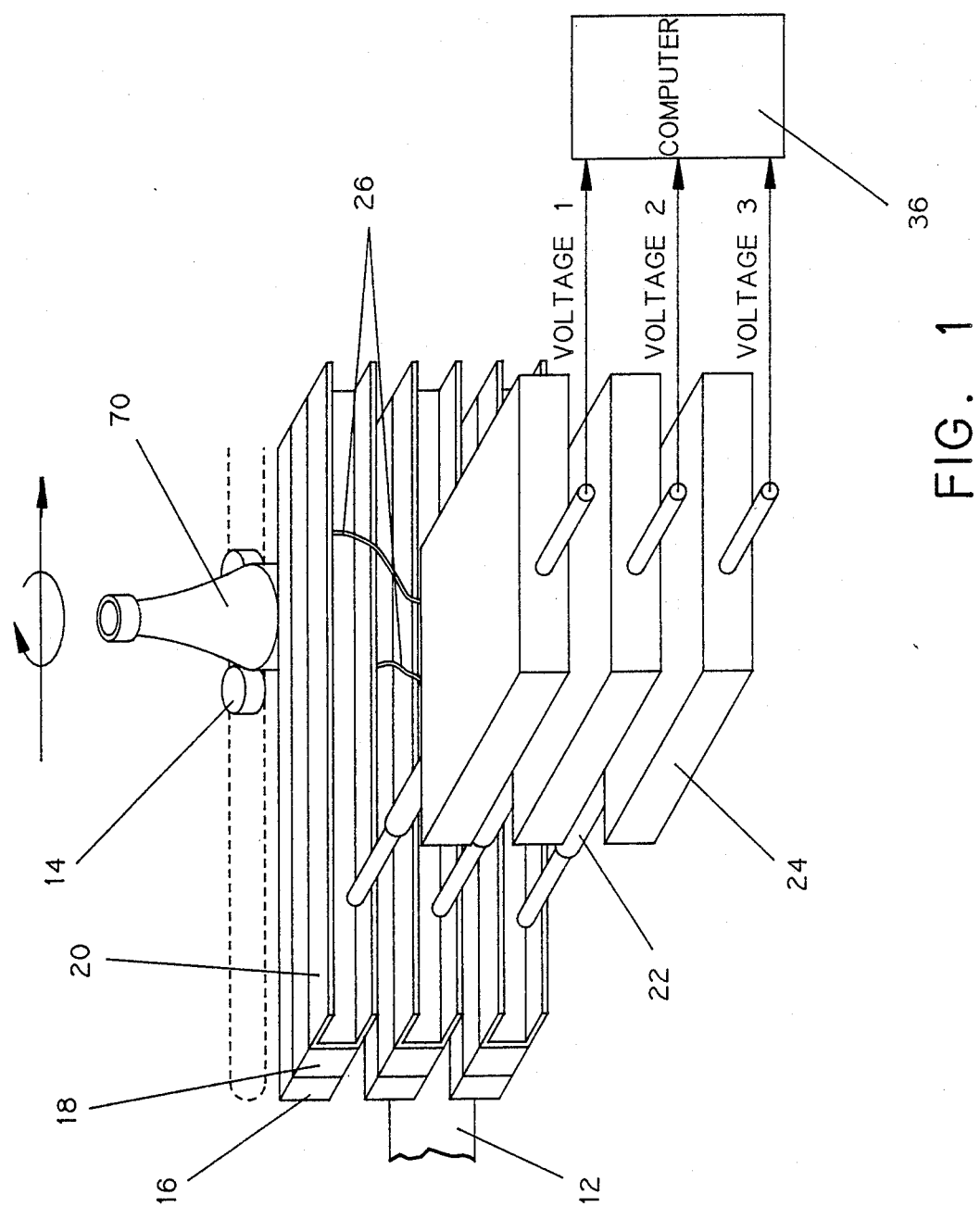
FIG. 1 is an oblique view of a station for testing a formed bottle in a glass container inspecting machine to ascertain whether there are any unacceptable thin spots.

The glass container inspection machine has a station for testing a round bottle 10 which is supported by a support plate 12 and which is advanced along the support plate 12 by a bottle carrier 14 (or belt). During its displacement past the test station, the carrier 14 forces the bottle against a number (three) of parallel horizontally extending and vertically spaced capacitance sensing strips 16 which are secured to resilient foam strips 18 mounted on suitable brackets 20. The brackets are connected by posts 22 to corresponding head oscillator housings 24. Each head oscillator housed within the housings 24 therefor receives a capacitance signal via calibrated cables 26 and generates a voltage signal which is supplied to the computer 36.

Figure 2:
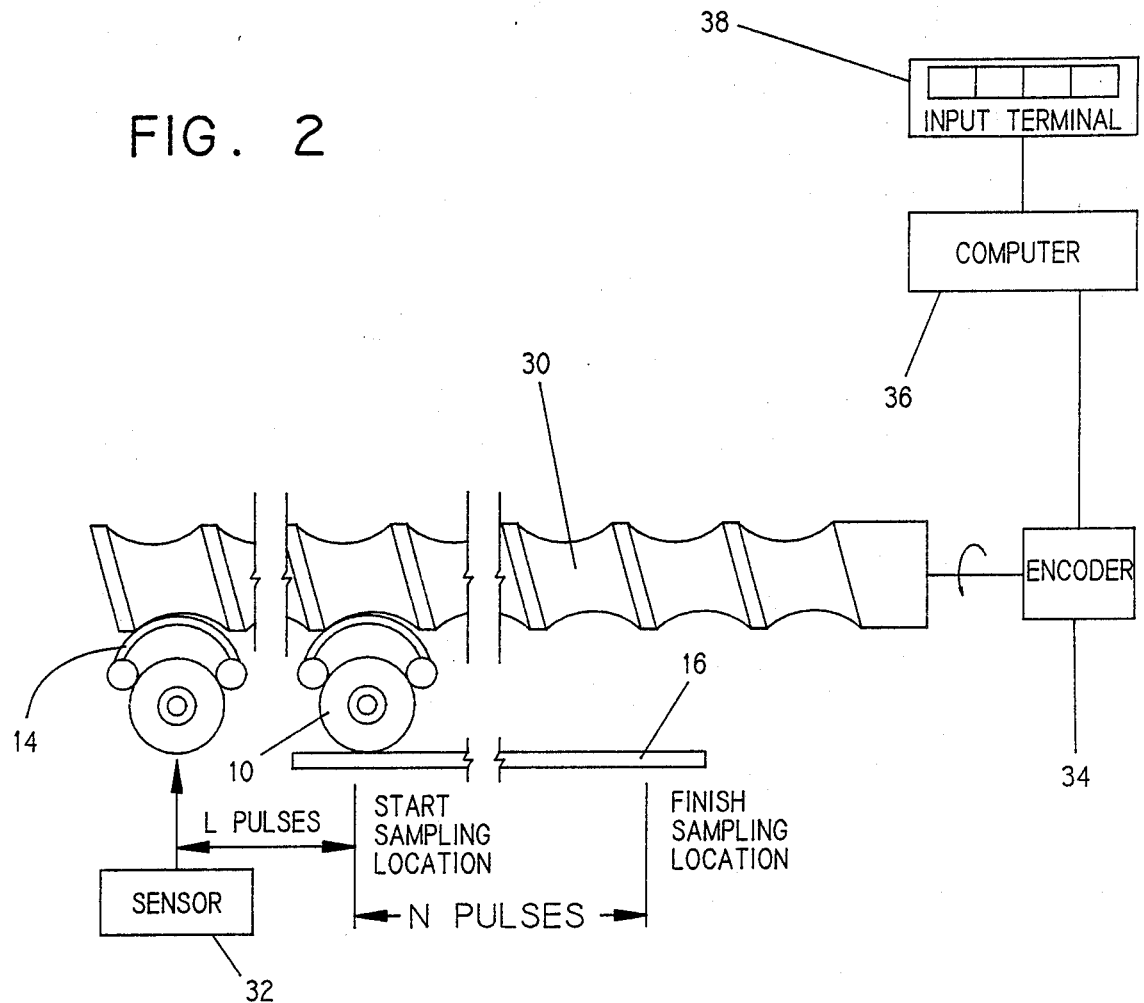
FIG. 2 is a schematic illustration of the mechanism for advancing the bottles through the test station.

FIG. 2 schematically illustrates the system for advancing the bottles to and through the test station. This system includes an elongated cam 30 which rotates at a constant speed. The cam engages a carrier 14 at a start position which is sensed by a suitable sensor 32. the rotational position of the cam is monitored by an encoder 34 and the encoder reading when the carrier is at this start position is defined as the start pulse by the computer 36. As the cam continues to advance the carrier 14, a captured bottle 10 will be translated towards the right until the bottle engages the capacitance strip 16 and reaches a desired start sampling location defined by a selected encoder count (L). The sampling will then take place with a data sample evaluated by the computer 36 at each subsequent count until the count reaches a selected number (N) which assures that the entire periphery of the bottle has been sampled (the Finish Sampling Location). For smaller bottles, a portion of this peripheral ring will be analyzed twice. The operator inputs the diameter of the bottle via a hand held terminal or the like 38 and the computer sets the correct N number for the bottle.

Figure 3:
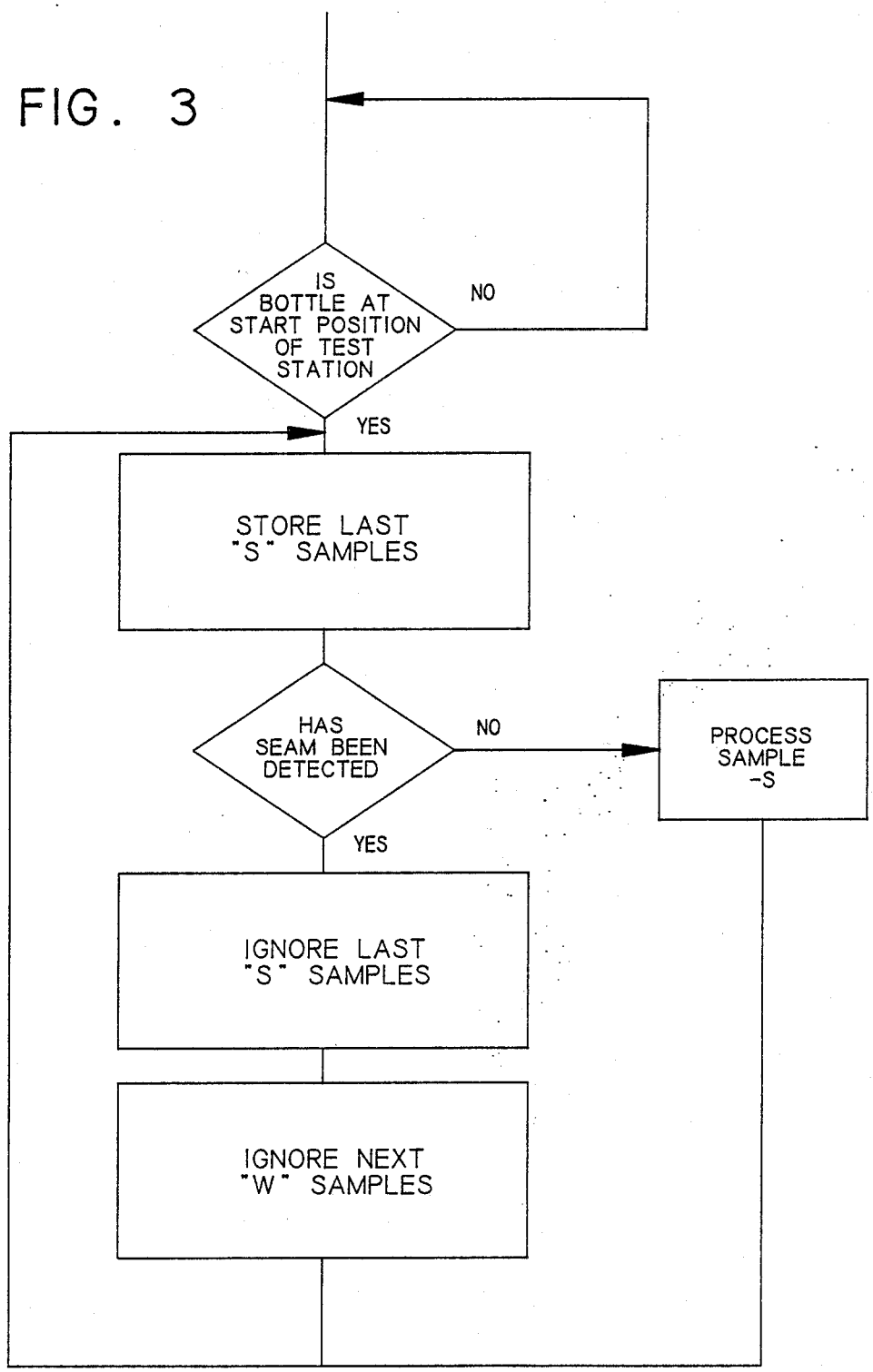
FIG. 3 is a flow chart illustrating the algorithm for defining the window during which data sampled proximate a seam will be ignored.
Figure 4:
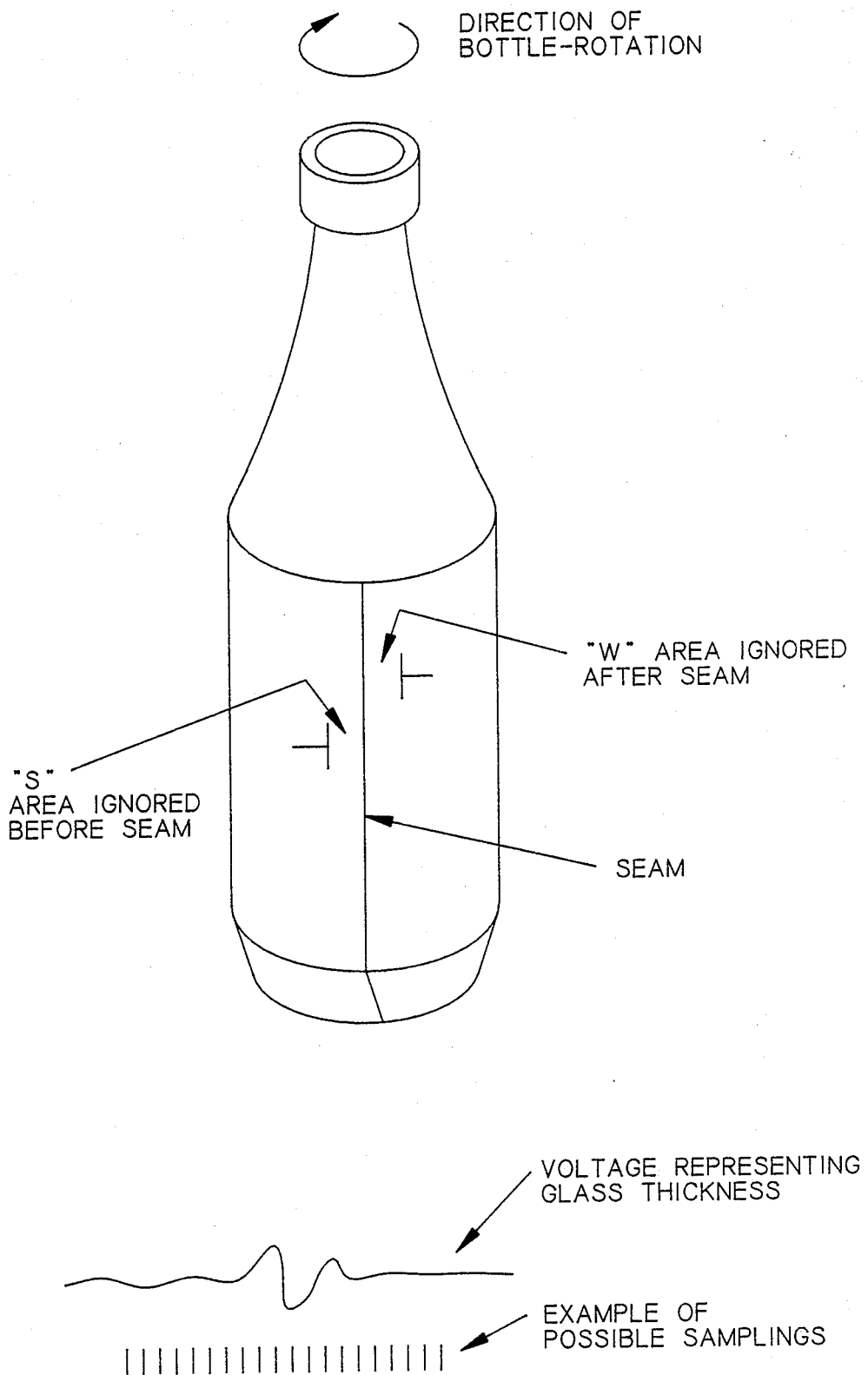
FIG. 4 is a diagram of the relationship between bottle seam and "S" and "W" samples.

As can be seen from FIG. 3, the last "S" (four, for example) data samples are stored in a Store Case "S" sample and each time a new data sample is placed in storage, the oldest data sample is processed by the Process Sample - S. A data sample will accordingly be evaluated at each pulse until the bottle wall seam has been detected by computer 36 in a conventional manner as discussed above; i.e. the computer 36 determines the rate of change or differential of the voltage representing glass thickness (see FIG. 4), and wherever this differential exceeds a selected threshold, a seam has been detected. The computer 35 thus includes a means for detecting the presence of a wall seam. sample data in the Store Case "S" samples will be ignored as will future data samples fr a "W" pulse count. "S" and "W" are setable to cover a selected window during which seam data would normally be evaluated. Following the counting of "W" pulses, the sample data will again be evaluated each pulse until the Finish Sampling Location is reached.

We claim:

1. A glass container inspection machine for inspecting the wall thickness of a round bottle having vertical seams comprising:

a test station for generating a continuous voltage signal representative of the thickness of a portion of the round bottle located at the test station, mechanical handling means for displacing a portion of the wall of a round bottle past said test station, encoding means for issuing pulses relative to surface displacement as said container passes through said test station, means for sampling the voltage signal whenever said encoding means issues a pulse during a predetermined sampling period, means for detecting the presence of a wall seam at said test station, means for ignoring the sampled voltage for a first selected number of pulses prior to the detection of a seam, and means for ignoring the sampled voltage for a second selected number of pulses following the detection of the seam.

2. A glass container inspection machine according to claim 1 further comprising:
means for selecting the first and second selected number of pulses corresponding to the diameter of the bottle to be tested.

3. A glass container inspection machine according to claim 2, wherein said selecting means includes means for inputting the diameter of the bottle to be tested.

* * * * *